United States Patent [19]

Suran et al.

[11] Patent Number: 5,127,669
[45] Date of Patent: Jul. 7, 1992

[54] MOUNTING MEANS FOR A VEHICLE PASSENGER SIDE AIR BAG STRUCTURE

[75] Inventors: Michael J. Suran, Clarkston; Ahmed El-Bohy, Oak Park; John M. Bederka, Madison Heights, all of Mich.

[73] Assignee: Chrysler Corporation, Highland Park, Mich.

[21] Appl. No.: 731,174

[22] Filed: Jul. 15, 1991

[51] Int. Cl.⁵ ............................................. B60R 21/22
[52] U.S. Cl. ..................................... 280/732; 220/4.21
[58] Field of Search ............... 280/728, 730, 731, 732, 280/736, 740, 741, 742, 743; 403/375, 382; 220/4.21, 4.24, 4.25; 52/611, 285, 732, 633, 272, 300; 422/3; 411/461; 29/402.14, 402.15

[56] References Cited

U.S. PATENT DOCUMENTS

| 2,117,308 | 5/1938 | Frey | 411/461 |
| 3,622,176 | 11/1971 | Byer | 280/731 |
| 3,680,886 | 8/1972 | Mazelsky | 280/740 |
| 3,708,181 | 1/1973 | Mazelsky | 280/740 |
| 4,111,457 | 9/1978 | Kob | 280/728 |
| 4,298,180 | 11/1981 | Evetz et al. | 29/402.15 |

FOREIGN PATENT DOCUMENTS

| 859364 | 12/1952 | Fed. Rep. of Germany | 52/272 |
| 282065 | 12/1964 | Netherlands | 52/633 |

*Primary Examiner*—Charles A. Marmor
*Assistant Examiner*—Karin Tyson
*Attorney, Agent, or Firm*—Edward A. Craig

[57] ABSTRACT

Mounting means for a vehicle passenger side air bag structure are provided. The air bag structure includes an air bag housing for containing an uninflated air bag and an air bag deployment chute mounted in a vehicle instrument panel opening on the passenger side. A portion of the air bag housing is slidably received in the air bag deployment chute. A connector bracket interconnects the air bag housing and air bag deployment chute preventing separation thereof during deployment of an air bag.

3 Claims, 2 Drawing Sheets

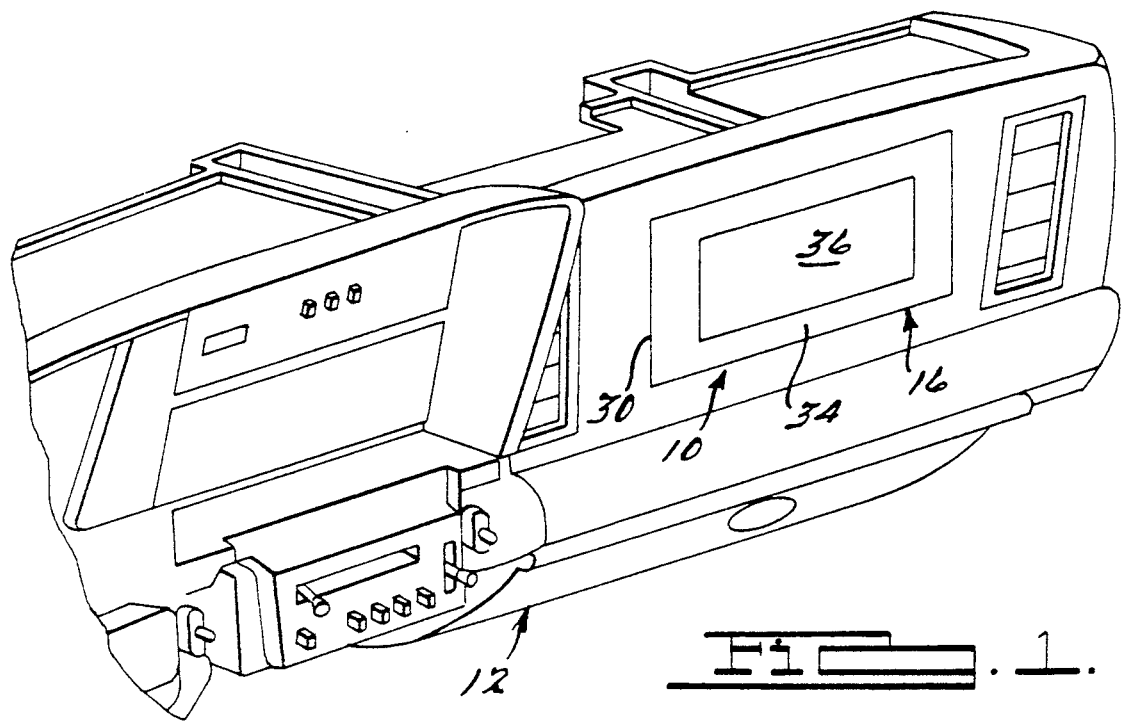
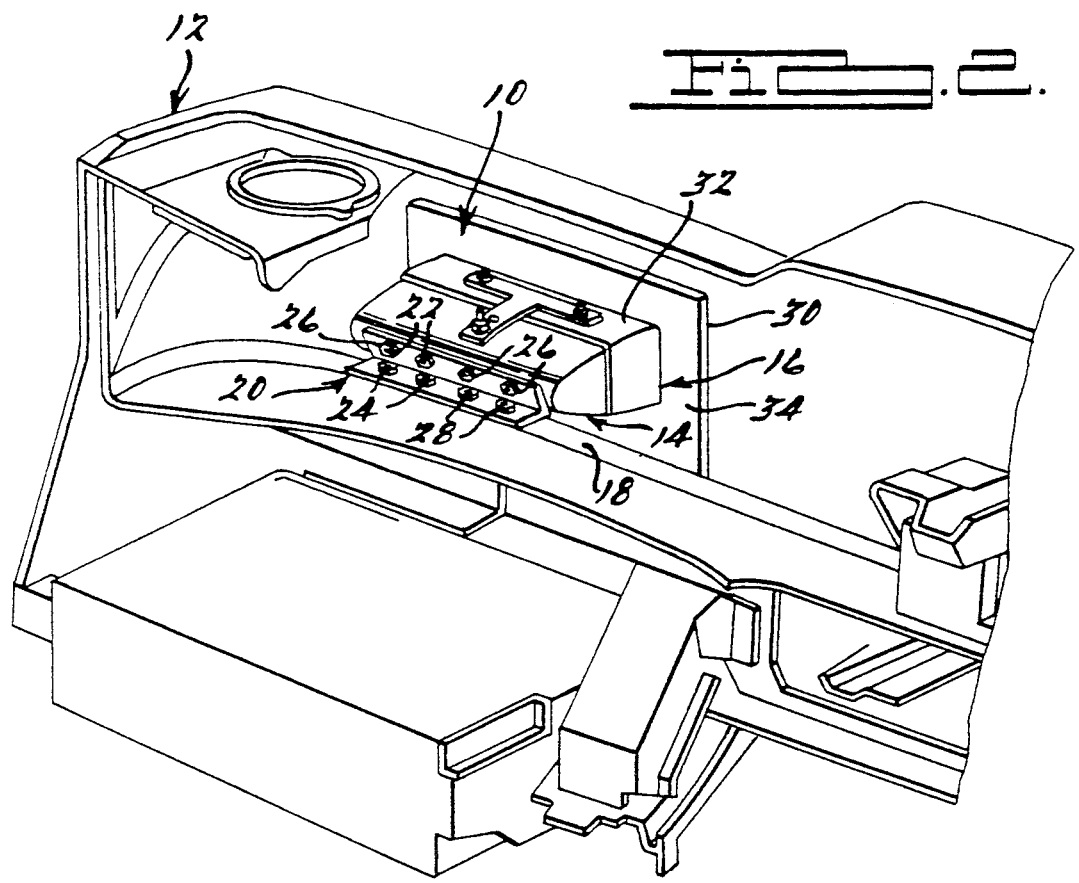

MOUNTING MEANS FOR A VEHICLE PASSENGER SIDE AIR BAG STRUCTURE

BACKGROUND OF THE INVENTION

1. Field of the Invention

This invention relates to mounting means for a vehicle passenger side air bag structure which includes an air bag housing which is slidably received in an air bag deployment chute mounted in an opening of a vehicle instrument panel. A connector bracket secures the housing and chute together.

2. Description of Related Art

Inflatable air bag structure are being commonly used in passenger vehicles to promote passenger safety in the event of an accident. Such air bag structures include inflation means which, when activated, rapidly form a gas which causes high speed inflation of air bags in front of passengers to absorb impact shock to thereby minimize injury. Sensor systems are provided to cause activation of the air bag structure immediately upon vehicle impact.

Air bags are folded and mounted in relatively small canister-like housings which are positioned behind the vehicle instrument panel. The housing is slidably mounted in a chute structure which, in turn, is mounted in an opening in the instrument panel in front of the area occupied by the passenger in the front seat of the vehicle. As the air bag is deployed, it passes into the chute and is guided by the chute into the proper area within the vehicle to function in the desired shock absorbing fashion.

It is important that the air bag be deployed through the chute without any hitches of any sort. The expansion which causes deployment of the chute also results in a recoil effect upon the air bag housing. This recoil effect tends to cause separation of the air bag housing from the chute. Undue separation could cause snagging of the air bag with the chute and housing structure and result in improper air bag deployment. In accordance with the present invention, this possibility is minimized by providing adjustable bracket structure interconnecting the chute and air bag housing.

SUMMARY OF THE INVENTION

Mounting means are provided for a vehicle passenger side air bag structure which includes an air bag housing for containing an uninflated air bag. An air bag housing bracket is secured between the air bag housing and support structure of a vehicle.

An air bag deployment chute is mounted in an opening provided in a vehicle instrument panel on the passenger side thereof. A portion of the air bag housing is slidably received in the air bag deployment chute in a portion of the air bag deployment chute extending forwardly of the instrument panel.

A connector bracket is provided. The connector bracket is substantially T-shaped and includes a crossmember with a stem extending from substantially the center thereof. First fastening means secure the crossmember to the exterior of the air bag deployment chute. The stem has an elongated adjustment slot therein. Second fastening means extend through the elongated adjustment slot and secure the stem to the exterior of the air bag housing. The elongated adjustment slot accommodates variation in the position of the air bag housing with respect to the air bag deployment chute. The connector bracket prevents separation of the air bag housing and air bag deployment chute during deployment of the air bag.

Preferably, the first and second fastening means include first and second externally threaded spaced apart studs extending from the air bag deployment chute. The connector bracket crossmember has a pair of spaced apart openings therein. Each of said first and second studs extend through one of said openings. A third externally threaded stud extends from the air bag housing through the elongated slot. An internally threaded nut is received on each of the studs. The connector bracket is preferably fabricated on thin sheet material.

IN THE DRAWINGS

FIG. 1 is a view in perspective of the passenger side portion of an instrument panel as viewed from the interior of a vehicle illustrating the positionment of the passenger side air bag structure in accordance with one embodiment of the present invention;

FIG. 2 is a view in perspective of the opposite side of the instrument panel shown in FIG. 1 illustrating the forward portion of the passenger air bag structure;

DETAILED DESCRIPTION OF A PREFERRED EMBODIMENT

Figure 3:
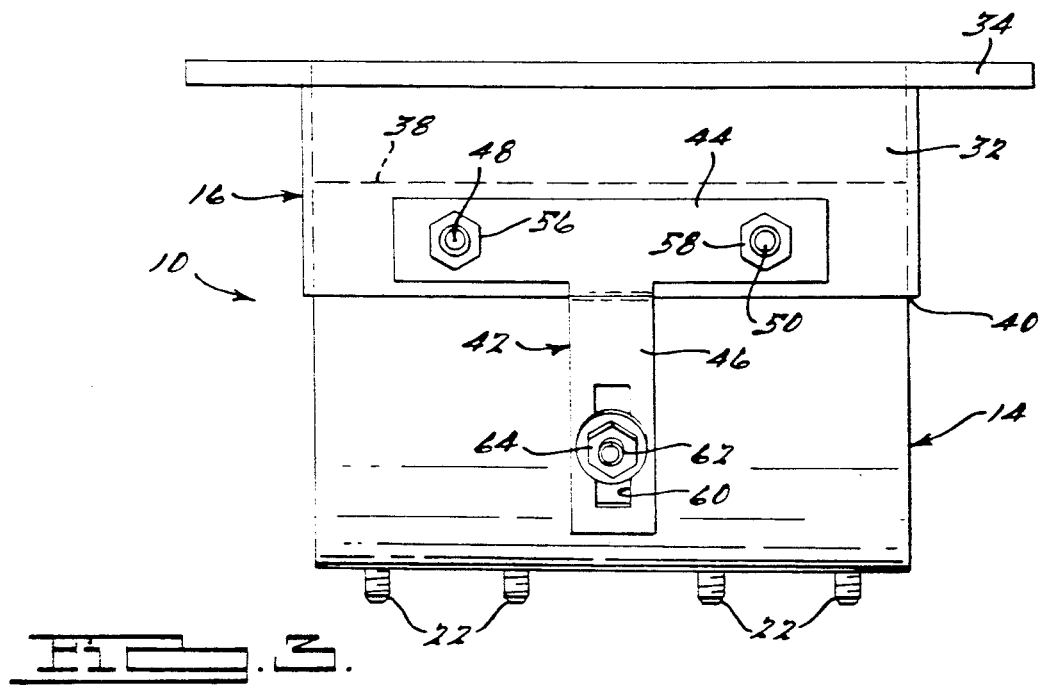
FIG. 3 is a top plan view of the vehicle passenger side air bag structure.
Figure 4:
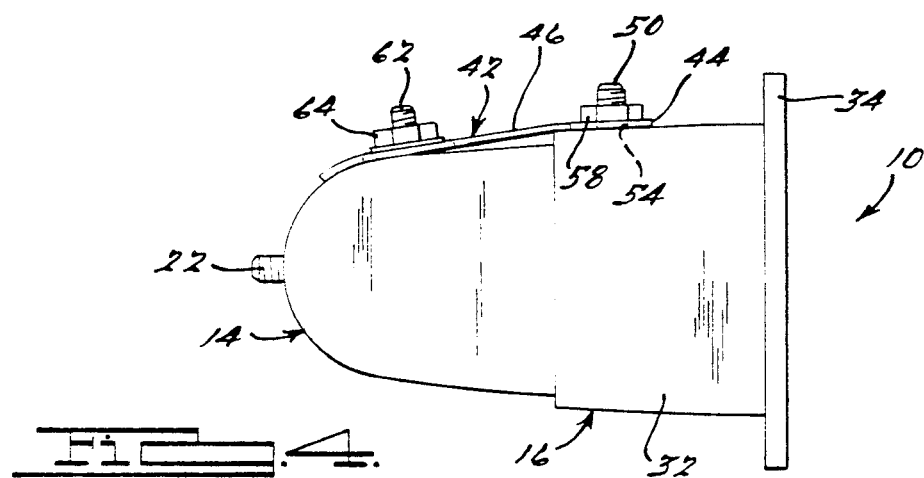
FIG. 4 is an end view of the passenger side air bag structure of FIG. 3 as viewed from the right side thereof.
Figure 5:
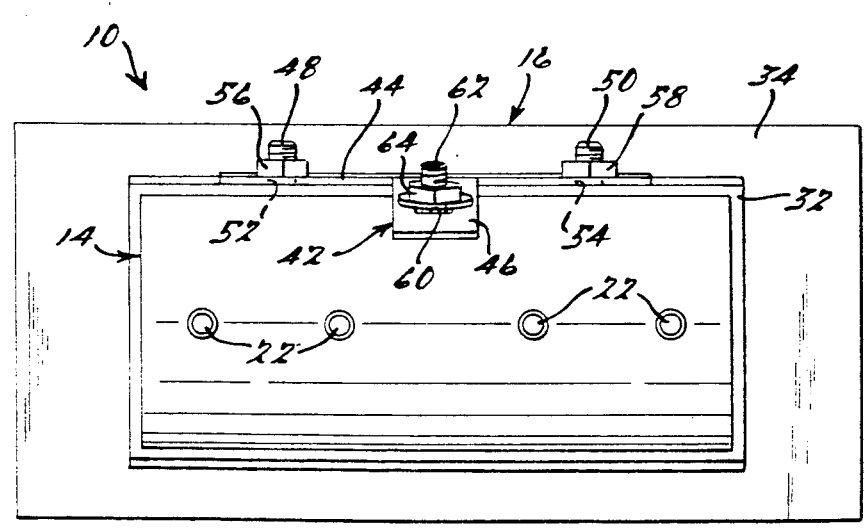
FIG. 5 is a front elevational view of the passenger side air bag structure.

Referring to FIGS. 1 and 2, it will be noted that the vehicle passenger side air bag structure 10 of the present invention is mounted on the passenger, or right, side of the instrument panel 12. The instrument panel 12 is, of course, securely mounted to vehicle structure as is conventional. The air bag structure 10 includes an air bag housing 14 and an air bag deployment chute 16.

The air bag housing 14 encloses a folded air bag and air bag inflater device (not shown) as is conventional. The air bag inflater device includes expansion means which, when energized, rapidly forms into an inflating gas. A sensor system (not shown) is provided in the vehicle structure for detecting impact and instantly causing air bag inflation. Such structures are conventional and well-known.

The air bag housing 14 is secured to vehicle support structure 18 by means of an air bag housing bracket 20. The bracket 20 is substantially V-shaped with each leg including a plurality of openings through which threaded studs 22 extending from the air bag housing 14 and threaded studs 24 extending from vehicle support structure 18 extend. Nut structures 26, 28 are received on the threaded studs to thereby secure the air bag housing 14 in place.

The air bag deployment chute 16 is mounted in an opening 30 provided in the instrument panel 12 on the passenger side thereof. The air bag deployment chute 16 includes a hollow chute portion 32 which is surrounded by a peripheral flange 34 on the rearward edge thereof, the terms "rearward" and "forward" being used to denote a position with respect to the forward or rearward end of the vehicle. The flange 34 is flush with the exterior surface of the instrument panel 12 as will be noted in FIG. 1. A frangible door 36 is provided within the flange 34. The door 36, when impacted by an expanding air bag, deploys rearwardly permitting the air bag to exit and expand in front of a passenger. The air bag deployment chute 16 functions to guide the air bag in its initial deployment and prevents the air bag housing 14 from bellmouthing, that is, expanding sidewardly, which could result in mis-deployment of the air bag.

A portion of the air bag housing 14 is slidably received in the air bag deployment chute 16. As will be noted in FIG. 3, the rearward edge 38 of the air bag housing 14 extends to about the midpoint of the air bag deployment 16. Inflation of the air bag results in a recoil effect which tends to separate the air bag housing 14 from the air bag deployment chute 16. Should the edge 38 of the air bag housing 14 recede to the edge 40 of the air bag deployment chute 16, it is possible for the air bag to become snagged and mis-deploy. It is therefore desired that such separation of these elements should not occur.

To accomplish this, a connector bracket 42 is provided secured between the air bag housing 14 and air bag deployment chute 16. The connector bracket 42 is substantially T-shaped and includes a crossmember 44 with a stem 46 extending from substantially the center thereof. The connector bracket is fabricated of thin sheet material such as sheet metal. First fastening means in the form of a pair of spaced apart externally threaded studs 48, 50 extend from the air bag deployment chute 16. The connector bracket crossmember 44 has a pair of spaced apart openings 52, 54 therein. Each of the studs 48, 50 extends through one of the openings 52, 54. An internally threaded nut 56, 58 is received on the studs 48, 50. The stem 46 has an elongated adjustment slot 60 therein. Second fastening means in the form of an externally threaded stud 62 extend from the air bag housing 14 through the elongated adjustment slot 60. An internally threaded nut 64 is received on the stud 62. The connector bracket 42 prevents separation of the air bag housing 14 and air bag deployment chute 16 during deployment of an air bag.

We claim:

1. Mounting means for a vehicle passenger side air bag structure comprising an air bag structure including an air bag housing for containing an uninflated air bag, an air bag housing bracket secured between the air bag housing and support structure of a vehicle, an air bag deployment chute mounted in an opening provided in a vehicle instrument panel on the passenger side thereof, a portion of the air bag housing slidably received in the air bag deployment chute in a portion of the air bag deployment chute extending forwardly of the instrument panel, a connector bracket, the connector bracket being substantially T-shaped and including a crossmember with a stem extending from substantially the center thereof, first fastening means securing the crossmember to the exterior of the air bag deployment chute, the stem having an elongated adjustment slot therein, second fastening means extending through the elongated adjustment slot and securing the stem to the exterior of the air bag housing, the elongated adjustment slot accommodating variations in the position of the air bag housing with respect to the air bag deployment chute, the connector bracket preventing separation of the bag housing and air bag deployment chute during deployment of the air bag.

2. Mounting means for a vehicle passenger side air bag structure as defined in claim 1, wherein the first fastening means includes first and second externally spaced apart threaded studs extending from the air bag deployment chute, the connector bracket crossmember having a pair of spaced apart openings therein, each of said first and second studs extending through one of said openings, a third externally threaded stud extending from the air bag housing through said elongated slot, and an internally threaded nut received on each of the studs.

3. Mounting means for a vehicle passenger side air bag structure as defined in claim 1, wherein the connector bracket is fabricated of thin sheet material.

* * * * *